United States Patent Office 3,170,711
Patented Feb. 23, 1965

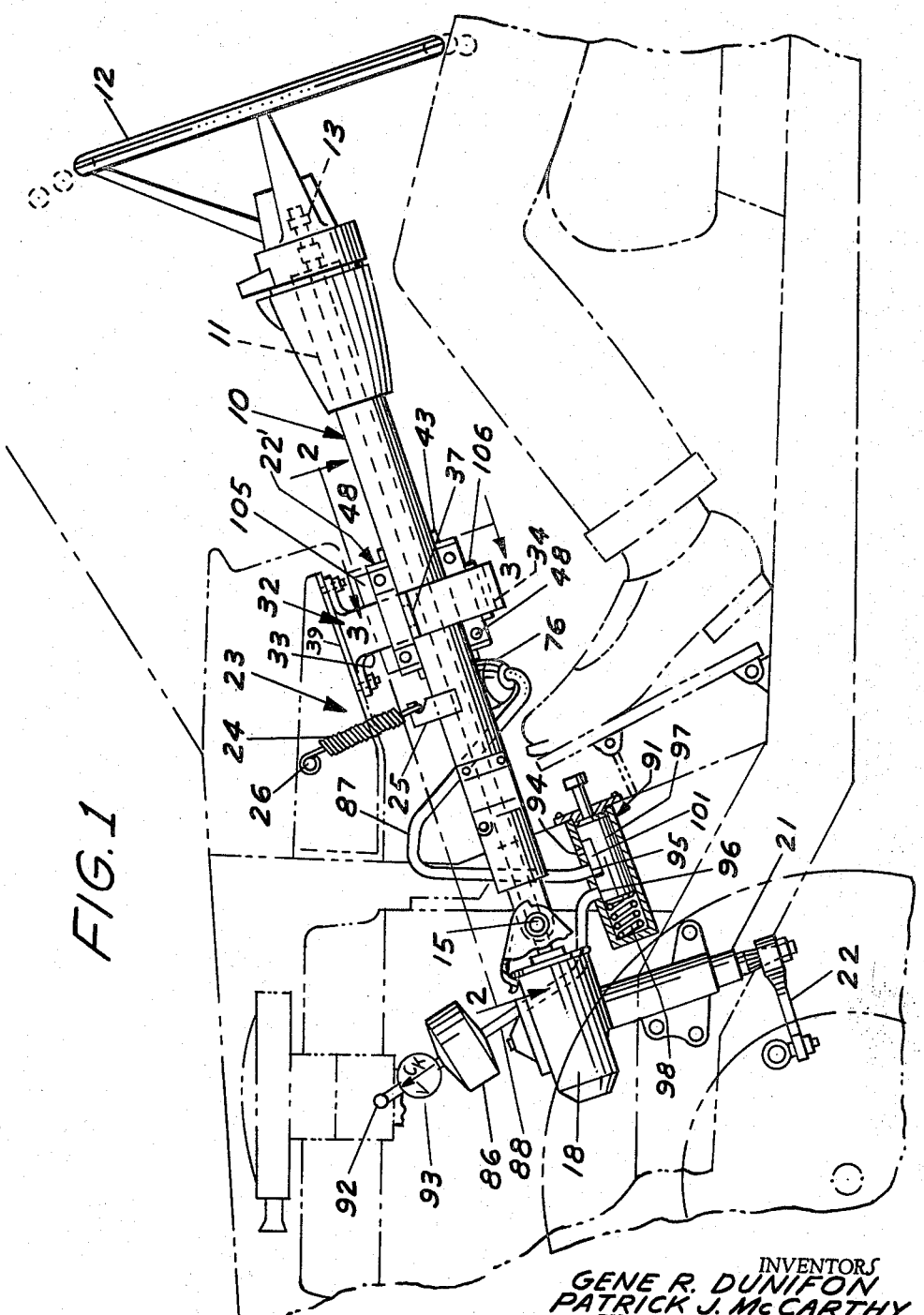

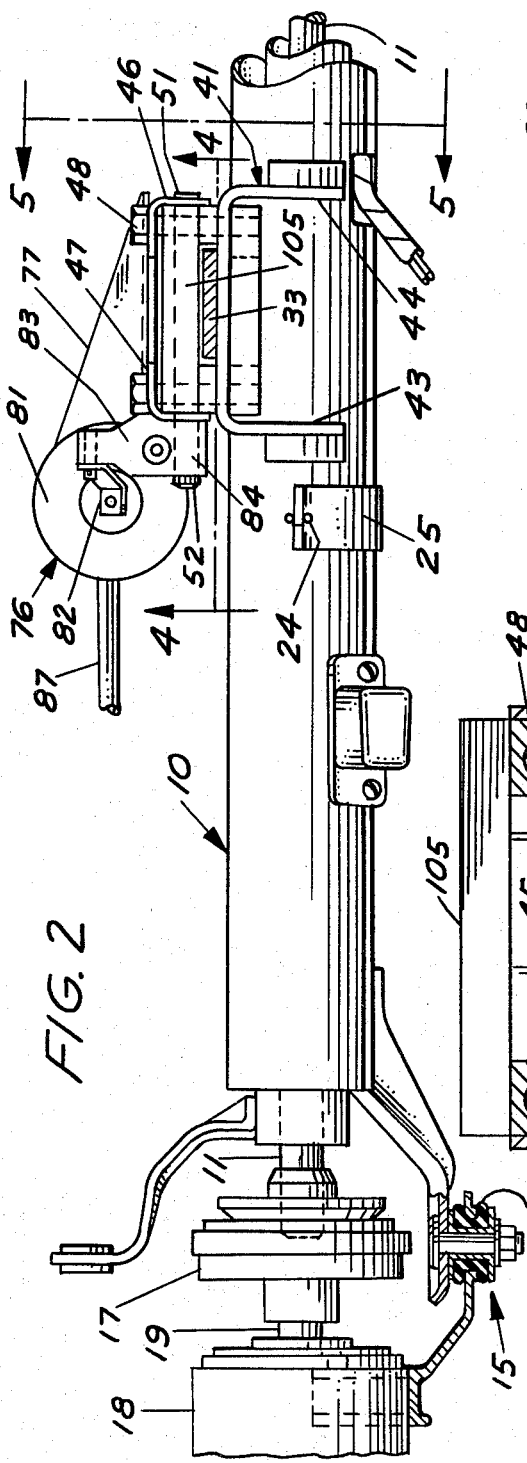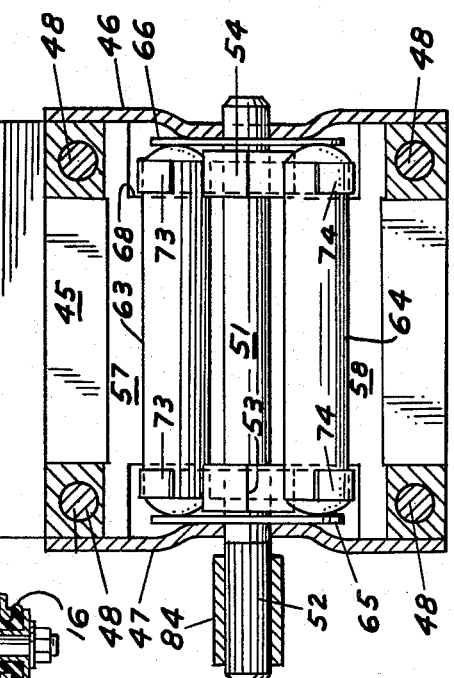

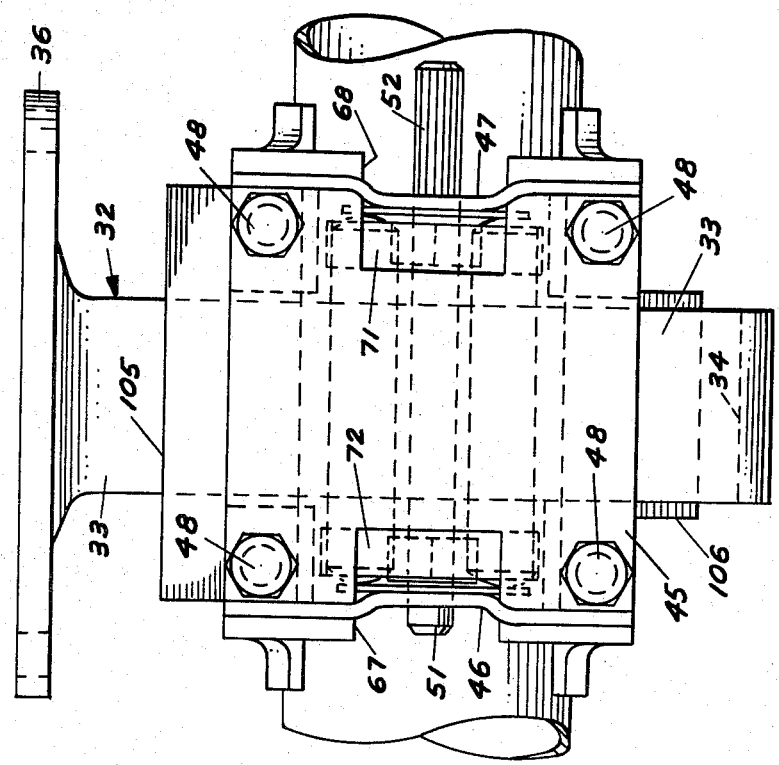
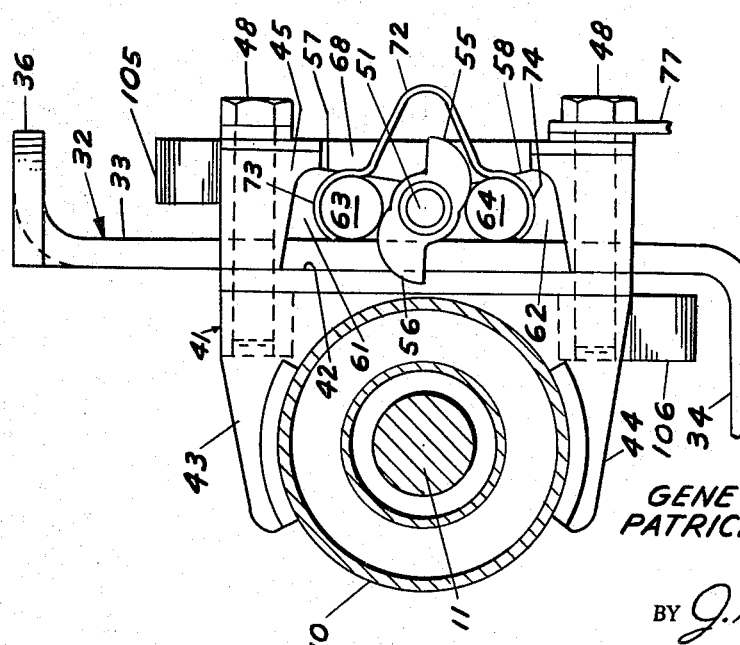

3,170,711
MOVABLE STEERING COLUMN
Gene R. Dunifon, Dearborn, and Patrick J. McCarthy, Livonia, Mich., assignors to Ford Motor Company, Dearborn, Mich., a corporation of Delaware
Filed Dec. 12, 1962, Ser. No. 244,124
7 Claims. (Cl. 280—87)

This invention relates to a motor vehicle steering mechanism and more particularly to a movable steering column for a motor vehicle.

In many modern automotive vehicles the steering wheel column extends substantially parallel to the horizontal plane of the vehicle, and the vehicle seat is positioned in close proximity to the lowermost point of the steering wheel. This arrangement presents some difficulty for many individuals in entering and leaving the driver's seat of the vehicle. In addition, a vehicle must be designed for the so-called average or normal person in regard to the position of the steering column and the driver's seat. It is obvious, however, that many individuals do not fit this normal or average pattern. There will be great variations in the size of people operating a given model or line of vehicle, particularly in the height of these individuals.

The invention provides a movable steering column that may be displaced from a normal operative position to a displaced position for the purpose of easy access to and egress from the driver's seat of the vehicle. In addition, the invention provides an adjustable steering column that may be adjusted into an infinite number of operative or driving positions preferably along a plane having a substantial vertical component. This latter feature permits the steering column to be adjusted for optimum steering ease and visibility for each individual vehicle operator.

In the invention a steering column is supported in a vehicle for movement from any one of the infinite number of operative positions to a displaced position that may be the uppermost operative position. A releasable locking mechanism is provided for releasably retaining the steering column in any one of the infinite number of operative positions. When the releasable locking mechanism is released by the motor vehicle operator, the steering column is moved from this position to the displaced position by suitable means engaging the steering column, for example, by means of a coiled helical spring. It can be readily seen that this feature provides a means for easy access to and egress from the driver's seat of the vehicle, since the driver need only release the latch means to have the steering column move to its displaced position.

The releasable locking mechanism comprises a plate member affixed to the motor vehicle body structure. This plate is received within the housing of the locking mechanism that is affixed to the steering column. The housing includes a pair of surfaces that are inclined with respect to a surface of the plate and are spaced from it. The planes of these inclined surfaces intersect at a central position in the housing. A pair of rollers are positioned within the housing and are dimensioned so that they will wedge between the plate and the inclined surfaces, with one roller wedging between the plate and one of the inclined surfaces and the other roller wedging between the plate and the other inclined surface. The rollers are spring urged into this position and a cam is positioned between the rollers. The cam can be rotated by the vehicle operator to spread the rollers thereby releasing the wedging effect and permitting relative movement between the plate affixed to the body structure and the releasable locking mechanism housing. The operator can then move the steering column to another position and the cam is rotated back into the position where the rollers again lock the plate member to the housing of the releasable locking mechanism. It can be appreciated from the foregoing that the releasable locking mechanism provides a means for positioning the steering column in an infinite number of operative driving positions.

An object of the invention is to provide a movable steering column for a motor vehicle that will provide easy access to and egress from the driver's seat of the vehicle.

A further object of the invention is the provision of a movable adjustable steering column that may be positioned in any one of an infinite number of operative or driving positions.

A further object of the invention is to provide a movable steering column that may be automatically moved from a normal operative position to a displaced position without appreciable physical effort on the part of the driver.

Other objects and attendant advantages of the invention will become more readily apparent as the specification is considered in connection with the attached drawings in which:

FIGURE 1 is a side elevational view of the steering column embodying the present invention;

FIGURE 2 is a top plan view of a portion of the steering column shown in FIGURE 1;

FIGURE 3 is a combined sectional and elevational view taken along the lines 3—3 of FIGURE 1;

FIGURE 4 is a combined sectional and elevational view taken along the lines 4—4 of FIGURE 2;

FIGURE 5 is a view taken along the lines 5—5 of FIGURE 2, and

FIGURE 6 is a side elevational view of the releasable locking mechanism shown in FIGURE 3.

Referring now to the drawings in which like reference numerals designate like parts throughout the several views thereof, there is shown in FIGURES 1 and 2 a steering column generally designated by the numeral 10. The steering column includes a steering shaft 11 to which a steering wheel 12 is suitably affixed, as shown at 13. The steering column is supported within the motor vehicle for movement among an infinite number of driving or operative positions and to a displaced position, preferably by means of a pivotal connection shown generally by the numeral 15. This pivotal connection preferably takes the form of a conventional resilient bushing 16 that has its axis positioned in a horizontal plane and a flexible coupling 17. The resilient bushing 16 and the flexible coupling 17 thus pivotally connect the steering column 10 to a support structure of the motor vehicle, for example, to a steering gear 18 that is supported within the motor vehicle. As is conventional in vehicular steering columns, the flexible coupling 17 connects the steering shaft 11 with input shaft 19 of the steering gear 18, and in this case is sufficiently flexible to permit movement of the steering column as described above. The steering gear 18 also includes an output shaft 21 that is connected to a steerable road wheel of the vehicle through conventional linkage 22.

The invention employs a means for releasably locking the steering column in any one of an infinite number of normal operative positions from a middle position as shown by the solid lines of the steering wheel 12 to upper and lower positions shown by the dotted lines of steering wheel 12. This means may take the form of a releasable locking mechanism designated generally by the numeral 22'. The invention also includes a means, designated by the numeral 23, for moving or urging the steering column from the normal operative positions to the uppermost or a displaced position when the locking mechanism 22' is released. This means is preferably a spring means 24 that has one end connected to a structural member 25 of the steering column and has the other end connected to the motor vehicle, for example, to a pin 26 positioned near the instrument panel.

The releasable locking mechanism 22' includes a support member or bracket 32, and as shown in FIGURE 5, this support member or bracket 32 is substantially U-shaped. It includes a first side 33 that forms a flat plate member, a bottom section 34 and a second side 35. The first side 33 and the second side 35 are suitably affixed through flanges 36 and 37 to a structural member 39 of the vehicle body as shown in FIGURE 1. The first side 33 that forms the flat plate member of the bracket 32 is received within the housing 38 of the releasable locking mechanism 22'.

A bracket 41 is employed as a means for fastening the housing 38 to the steering column 10. The bracket 41 has a planar surface 42 positioned in a plane parallel to the first side 33 of the bracket 32. This bracket is substantially U-shaped at each end (see FIGURE 3 for a view of one end of this bracket), and it has arms 43 and 44 positioned at each end that may be suitably affixed to the steering column, for example, by welding. The housing also includes a backing plate 45 and a pair of side plates 46 and 47 that are suitably affixed to the bracket 41 by means of a plurality of bolts as shown at 48. A shaft 51 with a serrated end portion 52 is journaled within the side plates 46 and 47. The shaft 51 carries a pair of cams 53 and 54 spaced along the length of the shaft 51, and are located just inboard of the side plates 46 and 47. As seen by reference to FIGURE 3, each of these cams has a pair of diametrically opposed lobes 55 and 56.

The backing plate 45 has a pair of inclined surfaces 57 and 58 that are spaced from the planar surface 42 and the plate member 33 of the bracket 32. These inclined surfaces intersect in the general area of the shaft 51. As shown in the specific embodiment of the drawings, the planes of these surfaces intersect in a line parallel to the axis of the shaft 51. This line of intersection is positioned to the right of the shaft 51 and passes through an extension of a line drawn between the center of the steering column 10 and the center of the shaft 51. This provides a pair of spaces 61 and 62 within the housing 38 that are of general wedge shape. The wedge shape space 61 narrows from the top of the housing 38 in a direction toward the shaft 51 and the wedge shaped space 62 narrows from the bottom of the housing toward the shaft 51. A cylindrical roller 63 is positioned within the space 61 and another cylindrical roller 64 is positioned within the space 62. Washers 65 and 66 are positioned over the ends of shaft 51 between the end plate 47 and cam 53 and between the end plate 46 and cam 54. These washers engage the ends of the cylindrical rollers 63 and 64 to prevent them from shifting axially.

As can best be seen by reference to FIGURE 3 and 6, the backing plate 45 has a pair of cutout portions or slots 67 and 68 positioned at each side thereof in the vicinity of the cams 53 and 54. Leaf springs 71 and 72 are employed as a means for biasing the rollers 63 and 64 toward each other into engagement with the lobes 55 and 56 on the cams 53 and 54. The leaf springs 71 and 72 are, in general, of the hairpin type. Each leaf spring has a semicylindrical portion 73 at one end that fits over the roller 63 and a semicylindrical portion 74 at the other end that fits over the roller 64. These leaf springs 71 and 72 urge the rollers 63 and 64 toward one another into firm wedging engagement with one side of the plate member 33 of the bracket 32 and with the inclined surfaces 57 and 58 of the backing plate. This wedging action locks the plate member 33 of the bracket 32 to the housing 38 and hence to the steering column 10. It can be appreciated that the roller 63 locks the steering column against upward movement and that the roller 64 locks the steering column against downward movement.

Suitable means are provided for rotating the shaft 51 in a clockwise direction as the shaft is viewed in FIGURE 3. This is a direction such that the lobes 55 and 56 of the cams 53 and 54 will force the rollers 63 and 64 apart and thus relieve the wedging action. This will permit the steering column 10 to be shifted upwardly or downwardly relative to the support bracket 32 and its plate member 33. This means takes the form of a standard vacuum motor 76 that is suitably mounted on a bracket 77. This bracket is affixed to the housing 38 of the releasable locking mechanism 22 by the bolts 48. As is conventional with this type of vacuum motor, it includes a diaphragm 81 that has one side exposed to the atmosphere, and this side of the diaphragm has an arm 82 affixed to it. A link 83 interconnects the end of the arm 82 positioned opposite the diaphragm 81 with the shaft 51 that carries cams 53 and 54. The link 83 is affixed to the shaft 51 by a complementary cylindrical member 84 that receives the serrated end 52 of the shaft 51.

The other side of the diaphragm 81 and a portion 85 of the vacuum motor 76 may be selectively connected to a vacuum source or accumulator 86 (see FIGURE 1) by means of lines 87 and 88 and a valve 91 that is positioned on the floorboard 90 of the vehicle. The vacuum accumulator 86 is connected to the intake manifold 92 of the vehicle engine through a check valve 93. The vacuum accumulator 86 provides sufficient vacuum to operate the vacuum motor 76 several times when the vehicle engine is not running.

The valve 91 is a spool type that includes a housing having three ports 94, 95 and 96. The port 94 is connected to the atmosphere, the port 95 is connected to line 87 and the port 96 is connected to line 88. The spool 97 is spring loaded by spring 98 so that a groove 101 spans the ports 94 and 95 thereby connecting the vacuum motor 76 to atmosphere. Depression of the spool 97 against the bias of spring 98 by the vehicle operator's foot causes the groove 101 to span ports 95 and 96 and thereby connect the vacuum accumulator 86 to the vacuum motor 76 through line 88, port 96, groove 101, port 95 and line 87.

When the valve 91 is actuated by depression of the spool 97, the vacuum accumulator 86 will be connected to the vacuum motor 76 through the connections described above. The diaphragm 81 and the arm 82 will move downwardly, as viewed in FIGURE 5. This will cause rotation of the shaft 51 and the cams 53 and 54 by the action of the link 83 in a clockwise direction, as viewed in FIGURE 5. This will also be a clockwise direction as viewed in FIGURE 3, and the action will, therefore, spread the rollers 63 and 64 and thereby release the locking mechanism 22' and permit the steering column 10 to be adjusted along the length of the plate member 33 of the bracket 32. When the steering column 10 is in the proper position, the vehicle operator removes his foot from the valve spool 97, and the vacuum motor will be vented to atmosphere through the connections previously described. The springs 71 and 72 will then move the rollers 63 and 64 toward each other thereby rotating the cams 53 and 54 and the shaft 51 to re-establish the position of the mechanism as shown in FIGURE 5. The rollers 63 and 64 will again lock the plate member 33 of bracket 32 to the housing 38 and the steering column 10 will again be locked to the vehicle body through the releasable locking mechanism 22'.

The invention also includes stop means for limiting the travel of the steering column in both the upward and the downward direction. These stop means comprise a rubber stop member or bumper 105 positioned on the top side of the housing 38 and another resilient stop member or rubber bumper 106 positioned on the bottom side thereof. It can be seen that the resilient stop member or rubber bumper 105 will limit the upward movement of the steering column by contact with the flange 36 of the bracket 32, while the resilient stop member or rubber bumper 106 will limit downward movement of the steering column by contact with the bottom portion 34 of the U-shaped bracket or support member 32. These stop means not only limit the upward and downward movement of the steering column that may occur due to the action of the vehicle operator, but the rubber bumper 106 also limits the downward movement of the steering column should a malfunction of any type occur. For example, if the springs 71 and 72 break, releasing the locking mechanism 22', the steering column will merely move downwardly into a position where the resilient stop or rubber bumper 106 contacts the portion 34 of the U-shaped bracket 32.

In operation, assuming the steering column to be in a given position as selected by the operator and locked in this position, the operator may, when he desires to leave the vehicle, depress the spool 97 of valve 91. This will connect the vacuum accumulator 86 to the vacuum motor 76. This will actuate the vacuum motor 76 and rotate the arm 53 and 54 through the cams 82, link 83 and shaft 51 to spread the rollers 63 and 64. The locking mechanism 22' is thereby released by removing the wedging action of the rollers 63 and 64 against the plate member 33 of the U-shaped bracket 32. The spring means 24 will then move the column into a displaced or the uppermost position in which the stop member or rubber bumper 105 engages the flange 36 of the U-shaped bracket 32. The steering column 10 is, therefore, in a position to provide easy egress from the vehicle and easy access to it. When the vehicle operator removes his foot from the valve 91, the vacuum motor will be vented and the steering column will be locked in this uppermost position.

The driver, when returning to the vehicle, may again depress the spool 97 of valve 91 and thereby release the locking mechanism 22' through the action previously described. He may then position the steering column 10 and steering wheel 12 in an infinite number of varying driving positions to suit his purpose and may then lock the steering column in this position by removing his foot from the spool 97 of the valve 91. This valve 91 can be operated very much like a dimmer switch of a vehicle headlamp system, and thus is compatible with ordinary actions taken by a vehicle operator.

The locking of the steering column 10 in the uppermost position when the driver wishes to leave the vehicle serves as an aid in leaving and entering the driver's seat, since the driver can grasp the steering wheel 12 to assist his movements.

Also, during driving conditions the vehicle operator may shift the steering column 10 from one position to another merely by depressing the spool 97 of valve 91 and shifting the steering column 10. When he removes his foot from the spool 97 of valve 91 the steering column 10 will be locked in the new position.

The present invention thus provides a reliable and effective mechanism for positioning a steering column in any one of an infinite number of driving positions. Or stated differently, an effective mechanism is provided for infinitely variable adjustment of the position of a steering column. The movement of the steering column preferably takes place in a vertical plane. The invention also includes a means associated with this mechanism for providing easy egress from and access to the vehicle.

It will be understood that the invention is not to be limited to the exact construction shown and described, but that various changes and modifications may be made without departing from the spirit and scope of the invention as defined in the appended claims.

We claim:

1. In a motor vehicle, a movable steering column mounted in said motor vehicle for movement among a plurality of operable driving positions, a locking mechanism coupled to said vehicle and said steering column for locking said steering column in one of said plurality of driving positions, said locking mechanism including movable means for releasing said locking mechanism upon movement, a vacuum motor positioned adjacent said locking mechanism, linkage means coupling said movable means and said vacuum motor, a vacuum source, a foot operated valve positioned on the floor of the vehicle and adapted to be operated by the foot of the vehicle operator, said foot operated valve including means for connecting said vacuum source to said vacuum motor when said foot operated valve is in an actuated position and for connecting said vacuum motor to atmosphere when said foot actuated valve is in an unactuated position, whereby said vacuum motor is actuated and the locking mechanism is released when said foot actuated valve is in the actuated position.

2. In a motor vehicle, a steering column, means for pivotally mounting said steering column in said motor vehicle for movement in a substantially vertical plane among an infinite number of operable driving positions, a locking mechanism coupled to said vehicle and said steering column for locking said steering column in any one of said infinite number of driving positions, said locking mechanism including movable means for releasing said locking mechanism upon movement, spring means engaging said movable means for urging said movable means into position to lock said locking mechanism, a vacuum motor positioned adjacent said locking mechanism, linkage means coupling said movable means and said vacuum motor for moving said movable means when said vacuum motor is actuated, a vacuum source, a foot operated valve positioned on the floor of the vehicle and adapted to be operated by the foot of the vehicle operator, said foot operated valve including means for connecting said vacuum source to said vacuum motor when said foot operated valve is in an actuated position and for connecting said vacuum motor to atmosphere when said foot actuated valve is in an unactuated position, whereby said locking mechanism is released when said foot actuated valve is in the actuated position and said locking mechanism is locked when said foot actuated valve is in the unactuated position.

3. In an automotive vehicle, a steering column, a steering wheel coupled to said steering column at one end thereof, means pivotally mounting the other end of said steering column to said vehicle for pivotal movement in a substantially vertical plane, means coupled to said steering column and said vehicle for locking said steering column in an infinite number of different positions in said vertical plane, said means including a plate affixed to said vehicle, a housing affixed to the steering column receiving said plate, said housing having a surface inclined with respect to a surface of said plate, a roller, means for urging said roller into wedging engagement with said surface of said plate and said inclined surface of said housing, and means for releasing the wedging engagement of said roller with the surface of said plate and the inclined surface of said support member.

4. In an automotive vehicle, a steering column mounted for pivotal movement among an infinite number of spaced operable driving positions, a locking mechanism coupled to said steering column and said vehicle for locking said steering column in any one of said infinite number of operable driving positions, said locking mechanism comprising a plate affixed to said vehicle, a housing connected to said steering column, said housing including a pair of inclined surfaces positioned in spaced relationship with respect to a surface of said plate, said surfaces being inclined toward said plate, a pair of rollers positioned in engagement with said surface of said plate and said inclined surfaces, spring means coupled to said rollers for urging them toward one another, said inclined surfaces being inclined such that the distance between the inclined surfaces and the surfaces of said plate decreases in the direction toward which said rollers are urged, the space between the surface of said plate and said inclined surfaces being such that said rollers lock said plate and said support member together under the urging of said spring means, and means positioned between said rollers for moving them apart to release said plate from said support member whereby said steering column may be moved to another position.

5. In an automotive vehicle, a steering column, a steering wheel coupled to said steering column at one end thereof, means pivotally mounting the other end of said steering column to said vehicle for pivotal movement in a substantially vertical plane, means coupled to said steering column and said vehicle for permitting infinitely variable adjustment of said steering column in the vertical plane, said means comprising a plate affixed to said vehicle, a housing carried by said steering column, said housing including two surfaces that are inclined toward said plate, a rotatable cam positioned substantially at the point of intersection of said two surfaces, a first roller positioned on one side of said cam in engagement with said plate and one of said inclined surfaces, a second roller positioned on the other side of said cam in engagement with said plate and the other of said inclined surfaces, means coupled to said rollers for urging said rollers toward said cam and into wedging engagement with said plate and said surfaces to prevent relative movement between said plate and said support member, and means operable by the vehicle operator for rotating said cam to move said rollers apart and out of wedging engagement with said plate and said inclined surfaces whereby said steering column may be moved to another vertical position.

6. The combination of claim 5 in which said last mentioned means includes a vacuum motor, a vacuum source, linkage interconnecting said rotatable cam with said vacuum motor, and a valve operable by the motor vehicle operator to connect said vacuum motor with said vacuum source.

7. In a motor vehicle, a steering column mounted in said motor vehicle for movement into an infinite number of operable driving positions, a locking mechanism coupled to said steering column and said vehicle for locking said steering column in any one of said infinite number of operable driving positions, means coupled to said steering column and said vehicle for moving said steering column into a displaced position when said locking mechanism is released, said locking mechanism comprising a pair of spaced rollers, a member carried by said vehicle, a member carried by said steering column, and means engaging said rollers for urging said rollers toward each other into wedging engagement with said member carried by said vehicle and with said member carried by said steering column, and means operable by the vehicle operator for spreading said rollers against the urging of said last mentioned means for releasing said locking mechanism and for permitting said steering column to be moved relative to said vehicle.

References Cited in the file of this patent

UNITED STATES PATENTS

| | | |
|---|---|---|
| 546,380 | Colton | Sept. 17, 1895 |
| 2,041,065 | Hemphill | May 19, 1936 |
| 2,185,779 | Tveidt | Jan. 2, 1940 |
| 2,549,345 | Tamboli | Apr. 17, 1951 |
| 2,716,560 | Clipfell | Aug. 30, 1955 |
| 2,836,988 | Cashman | June 3, 1958 |
| 2,838,784 | Cooley | June 17, 1958 |
| 2,903,904 | Mackie | Sept. 15, 1959 |
| 2,910,887 | Helms | Nov. 3, 1959 |
| 2,927,655 | Leslie | Mar. 8, 1960 |
| 3,078,945 | Frey | Feb. 26, 1963 |

FOREIGN PATENTS

| | | |
|---|---|---|
| 902,586 | Germany | Jan. 25, 1954 |